G. H. CORLISS.
VALVE CONNECTION.
No. 185,855.                    Patented Jan. 2, 1877.
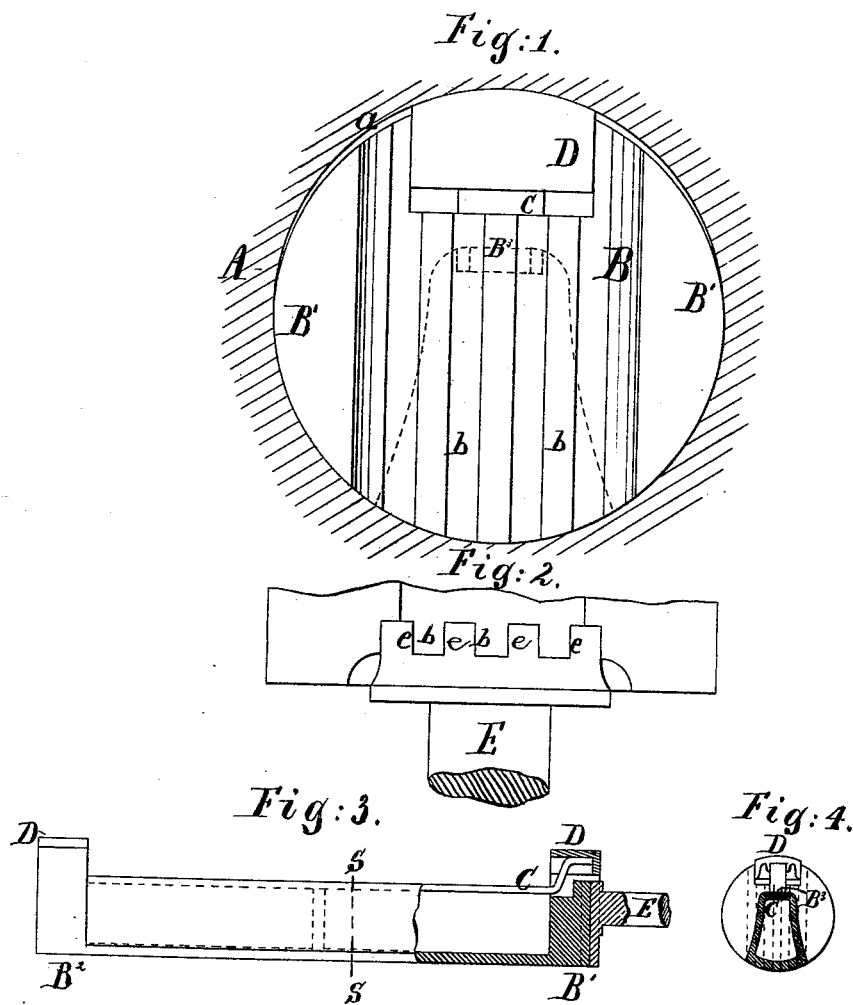

UNITED STATES PATENT OFFICE.

GEORGE H. CORLISS, OF PROVIDENCE, RHODE ISLAND.

IMPROVEMENT IN VALVE-CONNECTIONS.

Specification forming part of Letters Patent No. 185,855, dated January 2, 1877; application filed November 27, 1875.

*To all whom it may concern:*

Be it known that I, GEORGE H. CORLISS, of Providence, in the State of Rhode Island, have invented certain Improvements relating to Valve - Connections for Steam - Engines, of which the following is a specification:

The invention is adapted for all forms in which the valve opens and closes by partially turning on its axis. It is important to provide a strong and reliable connection with no considerable lost motion, and with liberty for the valve to move a little at right angles to the axis. It is common to flatten and widen the valve-stem, and extend it quite through the valve, providing in the valve a narrow and deep recess to receive it. I employ a long spring extending the whole length of the valve, and bearing as gently or as forcibly as may be required against broad-surfaced shoes, which press against the back side of the cylindrical cavity in which the valve works. That cavity I will hereafter call the valve-seat, and the side against which the valve bears the bearing - surface. I do not extend the valve-stem through the valve, but allow it to terminate after taking hold to a little depth at one end of the valve. The principle of the engagement is analogous to that of an ordinary screw-driver, with a score at the head of the screw. But instead of having only one score and one corresponding projection in the other part, I make quite a series of parallel grooves and ridges with perpendicular sides. The end of the valve-stem is spread, so as to present a large surface to act against the end of the valve, and both it and the adjacent surface of the valve are thus scored and let into each other. The valve can move to and from the bearing-surface, but is compelled to turn with the motion of the stem. The valve, thus relieved of the extension of the stem through it, may carry a spring of ample dimensions to serve all the purposes, with little strain on the metal thereof.

The accompanying drawings represent what I consider the best means of carrying out the invention. Figure 1 is an end view of the valve. Fig. 2 is a plan view, showing the same, and also the adjacent portion of the valve-stem. Figs. 3 and 4 are on a smaller scale. Fig. 3 is a side view of the valve entire, partly in section. Fig. 4 is a cross-section on the line S S.

Similar letters of reference indicate like parts in all the figures.

A is the portion of the main cylinder, or of the main cylinder-head, in which the cavity $a$ is formed to receive the valve. The entire valve will be referred to when necessary by the single letter B, its several parts receiving additional marks. The ends are nearly circular, as indicated by $B^1$ $B^2$. A ridge extending longitudinally along the back is marked $B^3$, and is hollowed out by coring and planing to receive a long spring, C, bent, as indicated, at the ends, and abutting at the center on a bearing on the valve. D D are shoes fitting in recesses provided in the back of the nearly circular ends of the valve, and receiving the force of the same spring C on each, to press it against the back of the valve-seat. The reaction of the spring on its center bearing holds the valve with proper tightness against the opposite bearing-surface, and the construction allows so much metal in the spring as insures an efficient and durable action. The spring C may tilt to accommodate either shoe. E is the valve-stem, supported by proper bearings in the casting A, and fitted with a stuffing-box. (Not represented.)

It will be understood that its outer end carries a rigid arm, through which the force to turn the valve in one direction and another is received. Its inner end is widened, being extended in one direction down nearly to the valve - face. The face which is presented against the end of the valve is formed in parallel grooves and ridges, as indicated by $e$, Fig. 2. The adjacent surface of the valve is correspondingly formed, and the ridges in the valve-stem engage in the grooves in the valve. The sides of the ridges and grooves being in planes parallel to the axis of the valve, there is no appreciable tendency of the parts to move endwise. A collar may be provided on the stem to resist any such tendency.

I claim as my invention—

1. The valve B, bearing shoes D D, and single longitudinal spring C, operating on each, as and for the purposes specified.

2. The valve B, provided with parallel grooves $b$ in combination with the independently-mounted stem E, provided with a series of parallel ridges, $e$, which fit into the grooves at the end of the valve, as and for the purposes specified.

In testimony whereof I have hereunto set my hand this 20th day of November, 1875, in the presence of two subscribing witnesses.

GEO. H. CORLISS.

Witnesses:
   ED. W. RAYNSFORD,
   GEORGE A. DODGE.